(12) United States Patent
Tschanz et al.

(10) Patent No.: US 7,106,128 B2
(45) Date of Patent: Sep. 12, 2006

(54) PROCESSOR APPARATUS WITH BODY BIAS CIRCUITRY TO DELAY THERMAL THROTTLING

(75) Inventors: James W. Tschanz, Portland, OR (US);
Stephen H. Tang, Pleasanton, CA (US);
Siva G. Narendra, Portland, OR (US);
Vivek K. De, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 142 days.

(21) Appl. No.: 10/982,266

(22) Filed: Nov. 3, 2004

(65) Prior Publication Data

US 2006/0091935 A1 May 4, 2006

(51) Int. Cl.
*G05F 1/10* (2006.01)

(52) U.S. Cl. ..................................... 327/534; 327/513
(58) Field of Classification Search ................ 327/512, 327/513, 530, 534, 535
See application file for complete search history.

(56) References Cited

U.S. PATENT DOCUMENTS

| | | | |
|---|---|---|---|
| 6,272,666 B1 * | 8/2001 | Borkar et al. ................... | 716/5 |
| 6,411,156 B1 | 6/2002 | Borkar et al. | |
| 6,484,265 B1 | 11/2002 | Borkar et al. | |
| 2006/0020838 A1 * | 1/2006 | Tschanz et al. ............. | 713/322 |

* cited by examiner

*Primary Examiner*—Jeffrey Zweizig
(74) *Attorney, Agent, or Firm*—Schwabe, Williamson & Wyatt, P.C.

(57) ABSTRACT

Apparatuses and methods for delaying thermal throttling of processor devices by decreasing threshold voltages are disclosed.

29 Claims, 6 Drawing Sheets

ZBB $V_{BS} = 0$

FIG. 3A
300

FBB $V_{BS} > 0$
$V_T \downarrow$
$I \uparrow$

FIG. 3B
302

FBB $V_{BS} < 0$
$|V_T| \downarrow$
$I \uparrow$

CBG

FIG. 6B

LBG for NMOS body bias

FIG. 6C

LBG for PMOS body bias

FIG. 7
700

PROCESSOR APPARATUS WITH BODY BIAS CIRCUITRY TO DELAY THERMAL THROTTLING

BACKGROUND OF THE INVENTION

1. Field of the Invention

Embodiments of the present invention relate to, but are not limited to, electronic devices, and in particular, to the field of processors.

2. Description of Related Art

In the operation of a processor device the temperature of the processor may fluctuate considerably depending on the activities of the various units of the processor device. A processor device as described herein may be, for example, a microprocessor that resides on a die or a microprocessor package. Such devices are typically comprised of at least the core of a processor (processor core) that is made of numerous functional blocks or component units. These functional blocks may include, for example, execution units, register files, cache memory, control circuitry, and clock generation circuits. These functional blocks may be disposed in different portions of the processor core. Each of these functional blocks may be further comprised of numerous transistors such as n-channel metal-oxide semiconductor (NMOS) and/or p-channel metal-oxide semiconductor (PMOS) devices.

When a processor device is idle, many of the functional units may be shut off and the overall processor temperature may be relatively low. However, when the processor is in use and depending upon the application being run on the processor, the amount of heat generated by each of the functional blocks may vary significantly. This may cause the processor device to experience significant temperature variations and may even result in hotspots forming within the processor core. The "speed" at which these processor devices can operate will typically depend upon their operating temperatures.

The operating speed of a processor device is normally influenced by several factors. These various factors may include for example, clock frequency, circuit delay, and thermal throttling.

The clock frequency is the frequency of periodic pulses that are used to schedule the operation of the processor device, which may also be referred to as the operating speed of the processor device. The clock frequency is typically preset during the initial testing of a processor device. The clock frequency for a processor device is typically set during the testing stage of the processor device. The clock frequency will likely be preset based on the operating temperature that the processor device is likely to experience during its operation and the speed at which the processor device can be operated at that temperature with no or a "minimum" amount of errors (i.e. an amount of error within an acceptable precision threshold). Processor devices typically can operate at higher speeds when the operating temperature is relatively low. For example, if the operating temperature of a microprocessor is expected to be relatively low, then the clock frequency may be set at a relatively high rate than if the operating temperature is projected to be relatively high.

Circuit delay, in contrast, relates to the amount of time it takes for signals to transmit from one point to another point of a circuit. That is, one way to define a circuit delay is to define it as the amount of time it takes for a signal to propagate along a signal path. In a processor device, the amount of the delay will typically increase when the operating temperature of the processor increases.

Thus, the clock frequency is typically also preset at a particular level to match the circuit delays under the expected operating temperature in normal operating conditions. Unfortunately, there are situations whereby the temperature of a processor will rise beyond what was projected to be the typical operating temperature. For example, applications that include a "power virus" may sometimes be run on a processor. These power viruses may make certain functional blocks contained in the processor to dissipate large amounts of heat by making these blocks do unnecessary work.

In order to address the temperature spikes that occur as a result of power viruses or other power-consuming applications, processor devices may incorporate thermal throttling. In thermal throttling, whenever the temperature of a processor is equal to or exceeds a throttling temperature, the processor is "throttled" or "throttled down" by reducing or shutting off the clock frequency, increasing the threshold voltages ($V_T$) of the transistors that make up the processor device and/or reducing the voltage supplied to the processor. Once the throttling has commenced, the processor activities are reduced, the heat being dissipated is reduced, and as a result, the processor device temperature falls into an acceptable range. Note that the throttling temperature is typically set in view of the temperature supported by the circuitry on the die for a fixed clock frequency. Once the temperature falls into the acceptable range, the processor is allowed to return to its normal operating speed.

Figure 1:
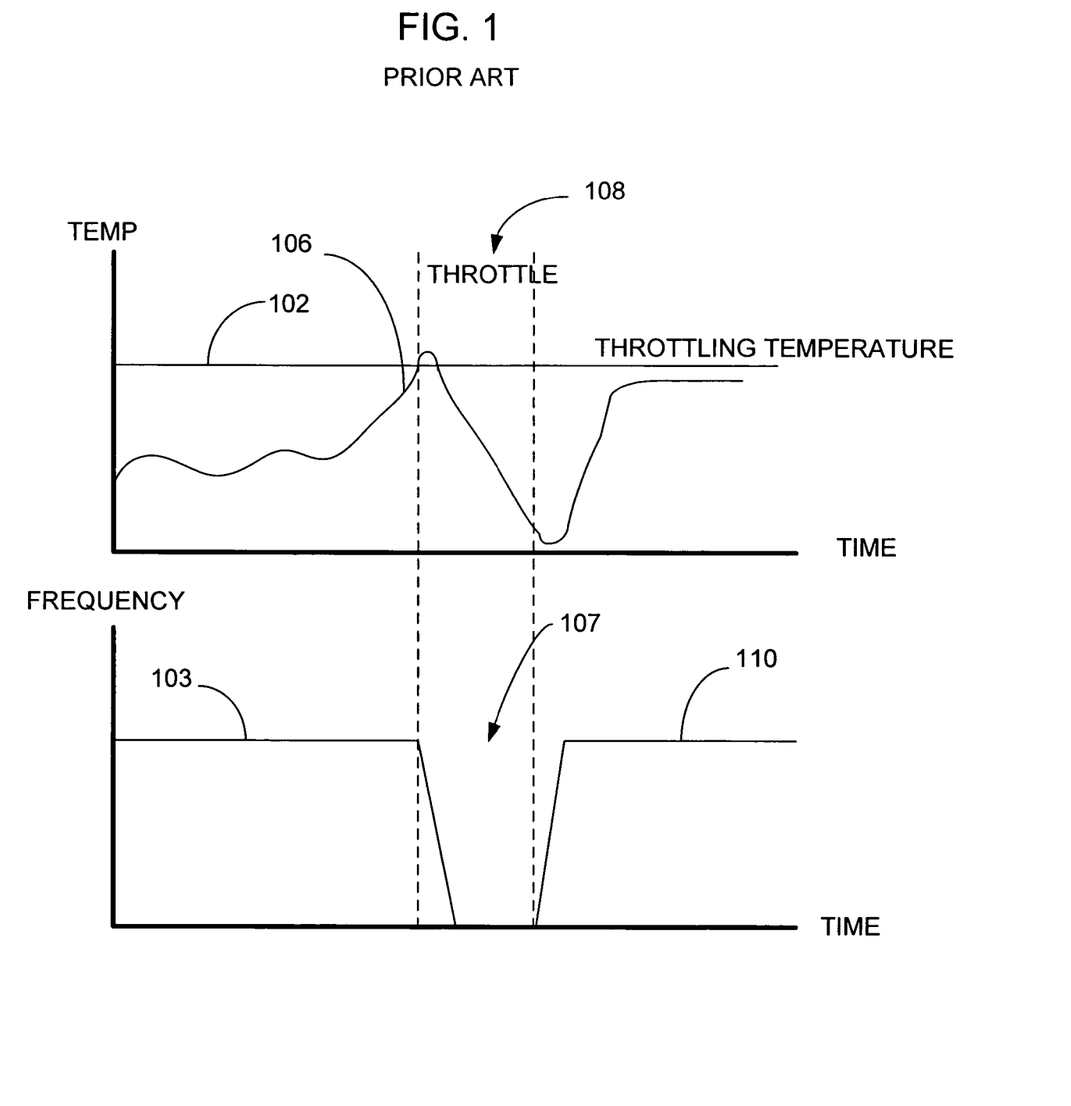
FIG. 1 illustrates throttling of a conventional processor device.

FIG. 1 depicts thermal throttling as implemented with a conventional processor device. When a conventional processor device is operating below the throttling temperature 102, the processor device may operate at a preset clock frequency as indicated by ref. 103. However, once the temperature of the processor device as indicated by ref. 106 rises above the throttling temperature 102, the processor device is throttled. This means that the clock frequency (and/or voltage) is reduced during the throttling period 108 as indicated by ref. 107. Although not indicated, in some cases, the threshold voltages of the transistors that may make up the processor device may be increased to further "slow down" the processor device. Once the processor device temperature 106 has fallen to within a desirable range of temperature, the throttling is ended and the frequency is allowed to go back up to the pre-throttling level as indicated by ref. 110.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

In the following description, for purposes of explanation, numerous details are set forth in order to provide a thorough understanding of the disclosed embodiments of the present invention. However, it will be apparent to one skilled in the art that these specific details are not required in order to practice the disclosed embodiments of the present invention. In other instances, well-known electrical structures and circuits are shown in block diagram form in order not to obscure the disclosed embodiments of the present invention.

In the course of operating a processor device many types of applications may be run on the processor device. A processor device, for purposes of this description, may include, for example, a microprocessor, a microprocessor package, a digital signal processor (DSP), a microcontroller, an application specific integrated circuit (ASIC), and the like. Some of the applications that are run on these processor devices such as those containing power viruses may result in the processor device performing computationally-intensive tasks that may result in the temperature of at least portions of the core of the processor device rising to unacceptable levels. In such situations, the processor device may be throttled in order to reduce the temperature of the at least portions of the processor core. However, unlike applications that include power viruses, there are also "useful" or "legitimate" applications that may make temperatures of portions of a processor core rise above the throttling temperature. Such temperature rises or temperature spikes may only be temporary, but nevertheless may result in the processor device throttling down. As a result of the throttle down, the execution speed of the processor may be sacrificed.

According to various embodiments of the invention, processor apparatuses or devices that have extended processor throttling range using forward body bias are provided. For the embodiments, a body bias circuitry may be provided with a processor device in order to prevent or delay throttling of the processor device. This may be accomplished, for example, by applying forward body bias to one or more transistors that may make up the processor devices and at least temporarily lowering instead of increasing the threshold voltages of the one or more transistors. In various embodiments, the processor device may be a microprocessor that may be imbedded on a die that may further be part of a microprocessor package. The processor device may include a processor core, a body bias circuitry, a control unit and one or more thermal sensors in the processor core. In other embodiments, the body bias circuitry may be part of the processor core. In yet other embodiments, the control unit may be part of the body bias circuitry. In still other embodiments, the body bias circuitry and control unit may be located on a different die than the processor core.

The methods and apparatuses described herein allow for the extension or delay of the throttling range of a processor device using forward body bias. For the embodiments, as temperature of at least portions of a processor core of a processor device rises above the throttling temperature of the processor device, forward body bias voltage may be applied to reduce the delay of one or more of the components in the critical paths of the processor core. These components, in some embodiments, may be transistors such as n-channel metal-oxide semiconductor (NMOS) and/or p-channel metal-oxide semiconductor (PMOS) devices. As described above, this may be accomplished by increasingly lowering the threshold voltages of the transistors. If the temperature of the processor core continues to rise after the forward body bias has been applied, then the forward body bias voltage may be increased as the temperature of the processor core passes trip points. That is, in various embodiments, these trip points may result in applying increasingly higher amounts of forward body bias voltage. If the temperature of the processor device continues to rise even with increasing forward body bias then the processor device may eventually be throttled. Using these methods and apparatuses, the processor frequency can be sustained past the original throttling temperature for some finite amount of time. This may allow applications that may normally cause short temperature spikes above the throttling limit to run at full speed without throttling, thus potentially improving the throughput of the processor.

Figure 2:
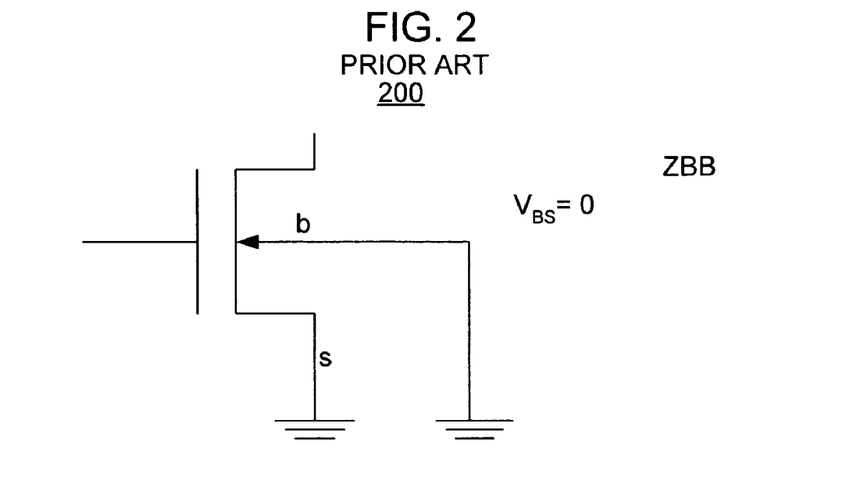
FIG. 2 illustrates a conventional NMOS device.

FIG. 2 depicts a conventional n-channel metal-oxide semiconductor (NMOS) transistor with zero body bias (ZBB). The NMOS transistor 200 includes a drain, a gate, a source, and a body. Both the source and the body are coupled to ground, and in the case of the body, the body is coupled to the ground via a substrate. When used with a conventional processor, a zero body bias (ZBB), $V_{BS}=0$, may be applied to the NMOS transistor 200. PMOS and NMOS transistors such as the one depicted in FIG. 2 will often populate the processor core of a conventional processor device. When operating in a processor device, an NMOS transistor 200 (as well as a PMOS transistor) will generate heat. The heat generated will, in turn, raise the overall temperature of the processor core. Eventually the temperature of the processor core may rise beyond the throttling temperature of the processor device resulting in the throttling down of the processor device.

Figure 3A:
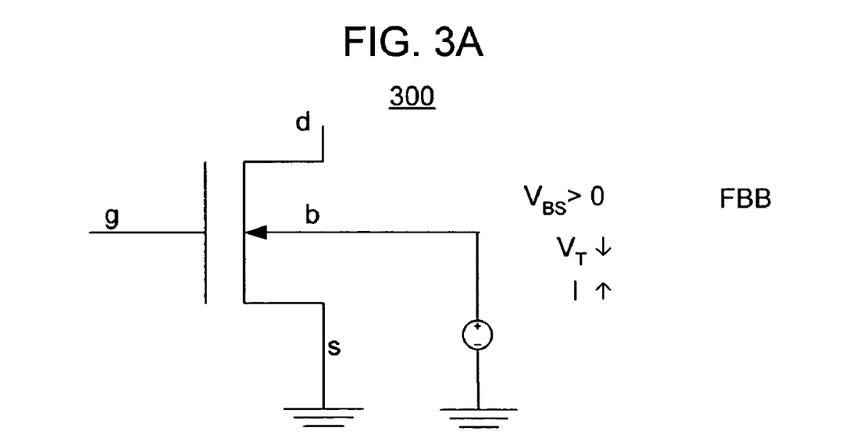
FIG. 3A illustrates an NMOS device with forward body bias in accordance with some embodiments.
Figure 3B:
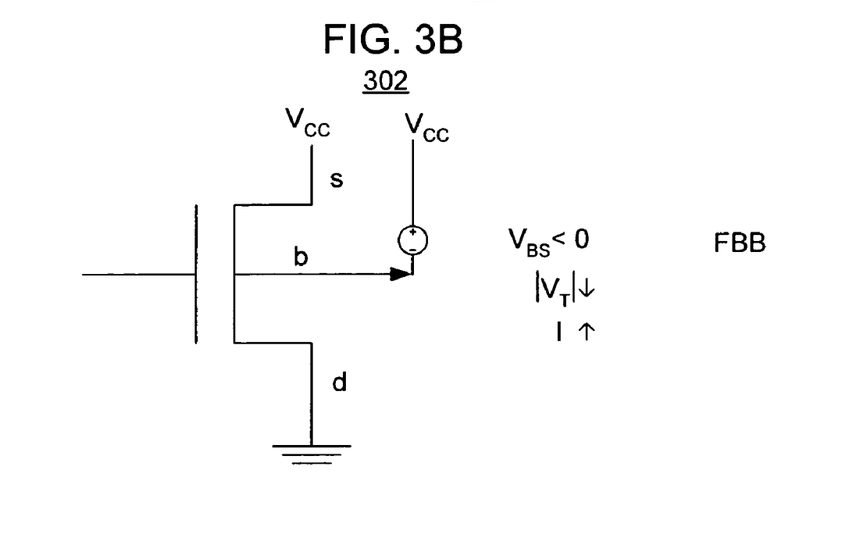
FIG. 3B illustrates a PMOS device with forward body bias in accordance with some embodiment.

FIGS. 3A and 3B depict an NMOS and a PMOS transistor that may be used to form a processor core of a processor device in accordance with some embodiments. For the embodiments, the transistors 300 and 302 include DC sources that are coupled to each of the transistor bodies. The DC sources, in various embodiments, may cause a forward body bias (FBB), $V_{BS}>0$ for NMOS and $V_{BS}<0$ for PMOS, to be applied to the transistors 300 and 302. By applying an FBB, the operating speed of the transistors 300 and 302 may be maintained even when the temperature of the transistors 300 and 302 are relatively high (e.g., above throttling temperature). That is, by applying an FBB, the threshold voltage ($V_T$) of the transistors (e.g., NMOS or PMOS) may be lowered which may result in an increase in the current (I). As a result, the transistors 300 and 302 may exhibit reduced switching delays. This may allow the processor device to continue operating at a relatively high speed even though the temperature of the processor core has exceeded the throttling temperature. Note that if the transistor being forward body biased is a PMOS, than the lowering of the threshold voltage of the PMOS means that the absolute value of the PMOS threshold voltage $|V_T|$ is being lowered since $V_{BS}$ is generally a negative value when forward biased (see FIG. 3B) is applied.

The actual forward body bias to be applied to the transistors (NMOS or PMOS) may depend on several factors including the type of transistors being forward biased, the temperature, and the characteristics of the process technology in which the devices are fabricated. For example, in some embodiments, the transistor being employed may be a NMOS transistor and the forward bias voltage may be between 0 and 500 mV.

According to various embodiments, several trip points (e.g., thermal conditions) may be employed in order to apply different amounts of FBB voltage that may further result in increasingly lower threshold voltages for one or more transistors. That is, according to these embodiments, the higher the processor core temperature is above the throttling temperature, the greater the FBB voltage to be applied. This may be accomplished, for example, by providing several trip points. Note that in this context, the term "greater" means that the absolute value of the voltage difference between the source and body of the transistor is greater since the voltage could be either positive or negative voltage depending upon, for example, whether the transistor being forward biased is an NMOS or a PMOS. Similarly, the term "lower" threshold voltages for transistors is a relative term depending upon whether the transistor being referred to is a NMOS or PMOS. For this description, the phrase "lower threshold voltage" means that the absolute value of the threshed voltage is lower.

This strategy may be demonstrated by the following example. Suppose an original throttling temperature (the temperature at which throttling would have originally taken place) is set at 100 degrees Celsius. The first trip point may be likewise set at 100 degrees Celsius. The first trip point (first thermal condition) may result in an FBB voltage of a positive or negative 0.1 volts to be applied depending upon whether it is an NMOS or PMOS to be forward body biased. As a result of the FBB, the threshold voltage (e.g., $|V_T|$) of the transistor (NMOS or PMOS) is lowered to a first lower threshold voltage. If the temperature continues to rise to 101 degrees Celsius, another trip point (second thermal condition) may be set off which results in the FBB voltage increasing to 0.2 volts. This may further result in the threshold voltage of the transistor being lowered to a second lower threshold voltage whereby the second lower threshold voltage is lower than the first lower threshold voltage. The FBB voltage may further be raised as the temperature of the processor core continues to rise until it reaches a final trip point (for purposes of this description, called "new throttling temperature"), for example, 110 degrees Celsius, at which point the FBB voltage is shut off and throttling may be implemented, which may, among other things, return the threshold voltage of the transistor(s) to its original level.

In various embodiments, a throttling limit (i.e., new throttling temperature) may still be used because the FBB may only delay the throttling, not eliminate the need for it. For example, if the application being run contains a power virus, the temperature of the processor core will not be a temporary temperature spike but rather a temperature rise that will remain undesirably high for an extended time period. Consequently, in some embodiments, it may be desirable to have the processor core to throttle down at a second higher throttling temperature (e.g., new throttling temperature).

According to various embodiments, by applying FBB to a processor device (e.g., NMOS and/or PMOS transistors in the processor core), the throttling of the processor device may be extended or delayed. For these embodiments, FBB may be used in order to compensate for the reduced circuit speed that may be as a result of high temperatures in at least portions of a processor core. Such FBB may be particularly useful in situations where a legitimate or useful application is being run on the processor device and the portions of the processor device experience temperature spikes of relatively short duration. In these embodiments, the FBB may reduce the threshold voltage of the transistors while increasing the current of the transistors. As a result, the speed of the processor circuitry may be maintained even when the temperature of the processor core rises beyond the throttling temperature.

Figure 4:
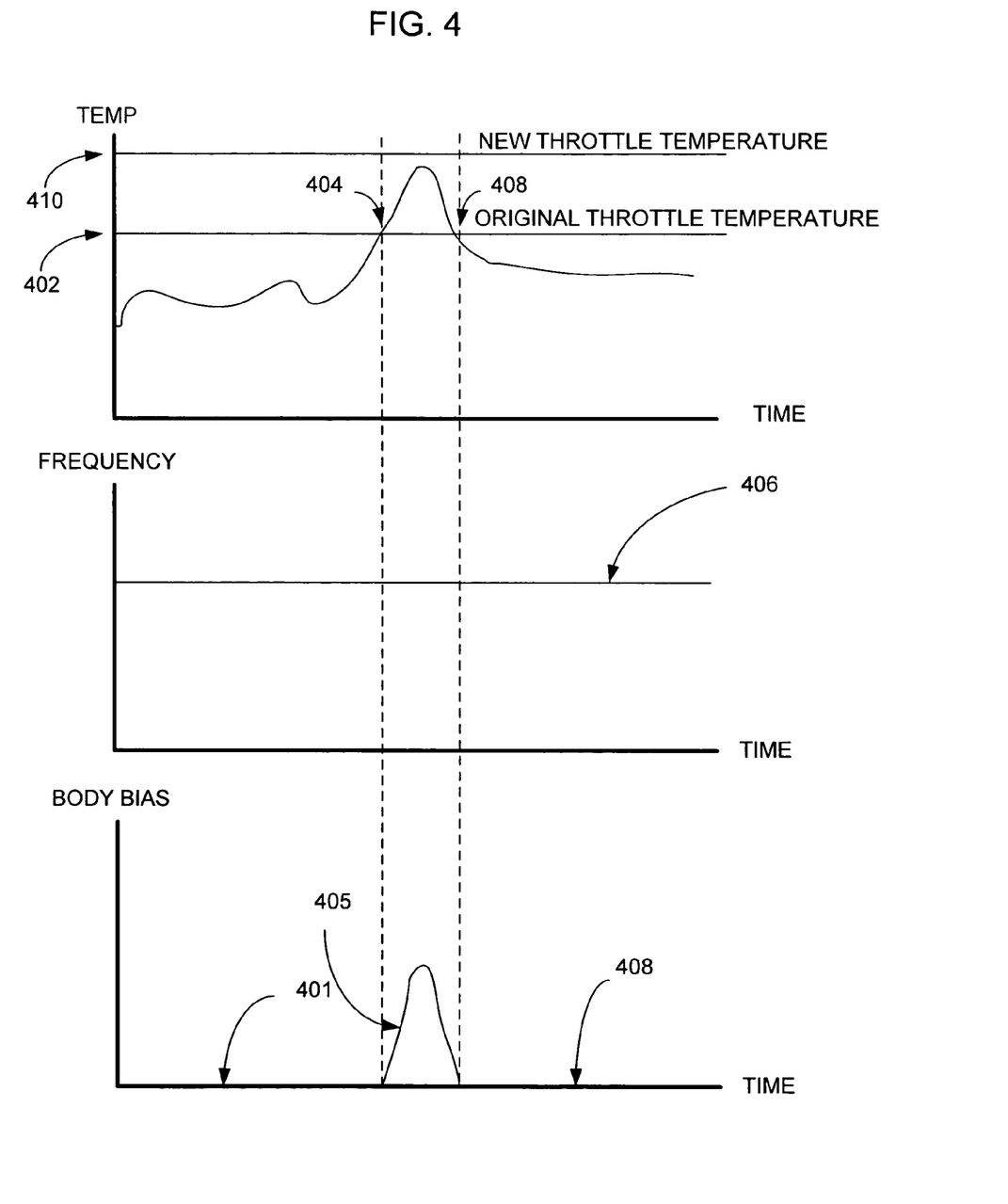
FIG. 4 illustrates the temperature, clock frequency, and body bias of a processor device that incorporates forward body bias in accordance with some embodiments.

FIG. 4 depicts the temperature, clock frequency and body bias of a processor device when forward body bias is applied to the processor device in accordance with some embodiments. Initially, the body bias being applied to the processor device (e.g., NMOS and PMOS transistors in the processor core) is zero, which represents zero body bias (ZBB) as indicated by ref. 401. When the temperature of the processor device crosses the original throttling limit or temperature 402 at point 404, an initial forward body bias voltage is applied to the processor device. As the temperature rises, the FBB voltage is increased as indicated by 405 to meet a target clock frequency, which remains constant as indicated by ref. 406. If the temperature levels off and begins to fall again (due to reduced activity in the processor device as may be typically experienced when a legitimate application is being run), the forward body bias may be reduced until the body bias is down to zero (as indicated by ref. 408). In this way, a constant frequency 406 is maintained and no throttling may be necessary.

However, if the activities of the processor device remains high even with the application of an FBB, the temperature of the processor device may continue to rise. At some point, even with the maximum amount of forward body bias being applied, the circuit delay may become too slow for the target clock frequency to be achieved. At this point, the processor device may be throttled down. Thus, in order to account for this possibility, a new throttling temperature as indicated by ref. 410 may be implemented. That is, if the temperature of the electronic device continues to increase and surpass the new throttling temperature 410, then the electronic device may be throttled down. This may occur, for example, when the application being run on the electronic device includes a power virus.

Figure 5:
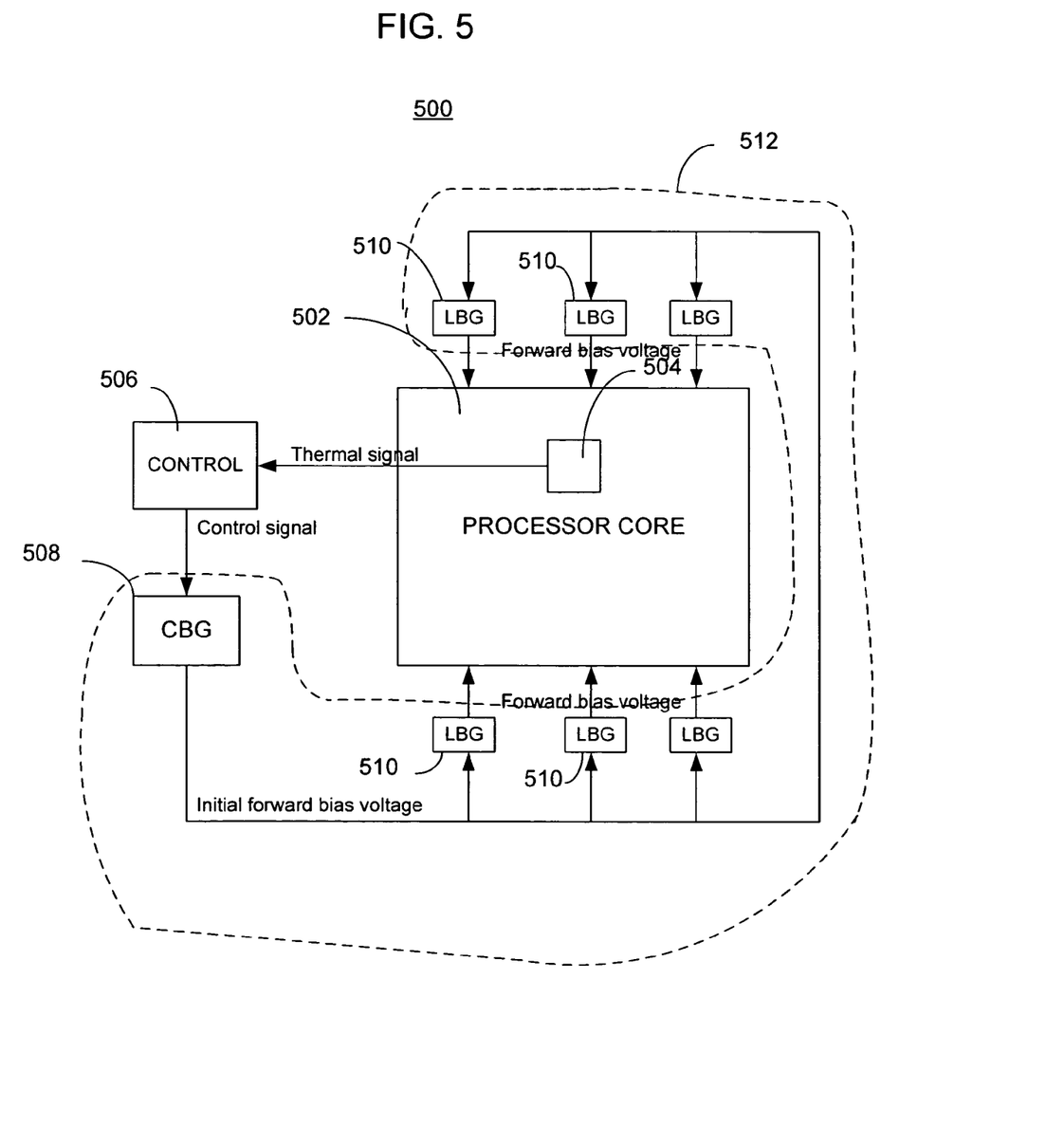
FIG. 5 illustrates a processor device with body bias circuitry in accordance with some embodiments.

FIG. 5 depicts a processor device that includes a body bias circuitry to generate forward body bias in accordance with some embodiments. For the embodiments, the electronic device 500 includes a processor core 502 that may include all of the necessary circuit blocks for the desired application—for example, computational units, register files, control logic, and the like. Located at or near a "hot spot" of this processor core is a thermal sensor 504. Although not depicted, the processor core 502 may further include numerous electronic components such as NMOS and PMOS transistors. Further, in other embodiments, instead of a single thermal sensor 504, a plurality of thermal sensors may be placed within the processor core 502. The thermal sensor 504 is coupled to a control unit 506, which is further coupled to a central b-ias generator (CBG) 508. The CBG 508 may be further coupled to a plurality of local bias generators (LBGs) 510. The CBG 508 and the LBGs 510 may comprise a body bias circuitry 512. The LBGs 510 may be further coupled to the transistors (NMOS or PMOS transistors) located in the processor core 502. In some embodiments in which the processor core 502 contains both NMOS and PMOS transistors, two separate body bias circuitries may be coupled to the processor core 502—one body bias circuitry coupled to the NMOS transistors and the other body bias circuitry coupled to the PMOS transistors.

Although the CBG 508, the LBGs 510, and the control unit 506 in FIG. 5 are depicted as being located outside of the microprocessor core 502, in other embodiments, one or more of these components may actually reside within the microprocessor core 502. For example, in some embodiments, these components may be distributed within the various functional blocks (see below) of the processor core 502.

In various embodiments, the entire processor device 500 may be located on a die such as a microprocessor die. In other embodiments, however, one or more of the components (e.g., control unit 506, CBS 508, and LBGs 510) may be separately located from the processor core 502 and/or the die in which the processor core resides on. For example, in some embodiments, the processor device 500 may be part of processor package that includes a processor die and a carrier substrate. In these embodiments, one or more of the components may be located on the carrier substrate instead of on the processor die.

The processor core 502 may include functional blocks. These functional blocks include, for example, execution units, register files, cache memory, control circuitry, and clock generation circuits. These functional blocks may perform various operations when an application is being run on the processor device 500, According to various embodiments, the thermal sensor 504 may be located near or at the hot spot of the processor core 502. The thermal sensor 504 may be used to provide temperature data (via thermal signals) for triggering application of FBB and/or to control the throttling of the processor device 500 when the processor core temperature, as monitored by the thermal sensor 504, crosses a programmable trip point or trip points (threshold temperatures). For these embodiments, the thermal sensor 504 may have several trip points or threshold temperatures.

For example, a first threshold temperature (see ref. 402 of FIG. 4) may correspond to the temperature at which FBB is first initiated. A second threshold temperature, which may be higher than the first threshold temperature, may be included that corresponds to the new throttling temperature (see ref. 410 of FIG. 4). This second threshold temperature may be used to throttle down the electronic device 500 if the temperature continues to rise even after FBB has already been fully implemented. This may occur, for example, if the application being run on the electronic device 500 includes a power virus or the application includes high computational portions.

Several additional threshold temperatures may be added between these two trip points (first and second threshold temperatures) to provide increasingly higher amounts of forward body bias voltage (and consequently, resulting in increasingly lower transistor threshold voltages) to the processor core if the temperature of the processor core is above the first threshold temperature but less than the second threshold temperature. In doing so, the speed of the processor device 500 may be better controlled when the temperature of the processor core 502 is somewhere between the first and second threshold temperatures.

According to various embodiments, the processor device 500 may include a control unit 506 that may be employed in order to interface the thermal sensor 504 to the CBG 508. For the embodiments, so long as the processor core temperature is below a first threshold temperature (e.g., original throttling temperature of FIG. 4), the control unit 506 may instruct the CBG 508 to apply zero body bias (ZBB), e.g. by way of a control signal. Under these circumstances, the performance of the processor device 500 may remain substantially unchanged.

As the processor core temperature rises above the first threshold temperature, the thermal sensor 504 indicates this to the control unit 506 by generating thermal signals, and at least a forward body bias may be applied. As the temperature continues to rise, the temperature may cross various trip points that are programmed into the thermal sensor 504, and the control unit 506 may instruct the CBG 508 to apply increasingly larger amounts of initial forward body bias by generating and transmitting to the CBG 508 control signals that instructs the CBG 508 greater amounts of initial forward body bias. In one embodiment, this may be implemented as a lookup table in the control unit 506 based on the output from the thermal sensor 504 indicating the temperature range. The lookup table may then provide the desired body bias voltage. If the temperature rises above the second threshold temperature (i.e., new throttling temperature in FIG. 4), the control unit 506 may then throttle the electronic device 500. On the other hand, if the temperature instead falls, the forward body bias may be reduced and may eventually go back to zero bias. As previously noted, the term "greater" (as well as "reduced") means that the absolute value of the voltage is greater (or smaller) since the bias voltage could be either positive or negative depending upon whether the transistor being forward biased is, for example, an NMOS or a PMOS.

In various embodiments, the body bias circuitry 512 is comprised of two main blocks: a central bias generator (CBG) 508 and many distributed local bias generators (LBGs) 510. For these embodiments, the CBG 508 may generate a bias voltage (i.e., initial froward bias voltage), which may be process, voltage, and/or temperature independent. The generated bias voltage may represent the desired body bias, and to that is to be applied to the transistors in the processor core 502.

The bias voltage output from the CBG 508 may be routed to the LBGs 510, which may be distributed around (and throughout) the processor device circuitry. The LBGs 510 may translate the voltage (initial forward bias voltage) generated by the CBG 508 to a final bias voltage (forward bias voltage), which may be referenced to or in view of the power supply of the LBGs. The LBGs 510 may further provide the drive strength to supply the forward bias voltage to the transistors in the processor core 502. Note that as previously described, if both NMOS and PMOS body bias is to be used, there may be separate CBG and LBG circuits for each of the NMOS and PMOS body bias (although they may share some components). The CBG 508 in some embodiments may be a D/A converter type device. The LBGs 510 in various embodiments may be buffer and/or amplifier devices. Additionally, for the purpose of this application, the voltage provided by a CBG 508 to a LBG 510 may also be referred to as a control signal provided to the LBG 510.

Figure 6A:
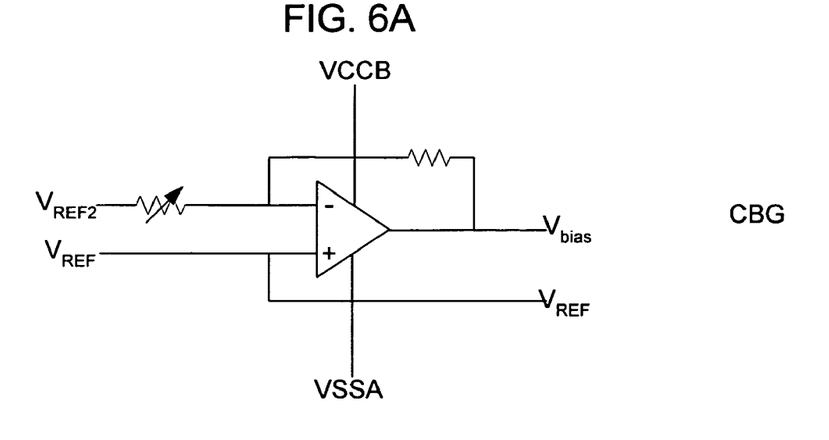
FIGS. 6A, 6B, and 6C illustrate exemplary central bias generator (CBG), NMOS local bias generator (LBG), and PMOS local bias generator (LBG) in accordance with some embodiments.
Figure 6B:
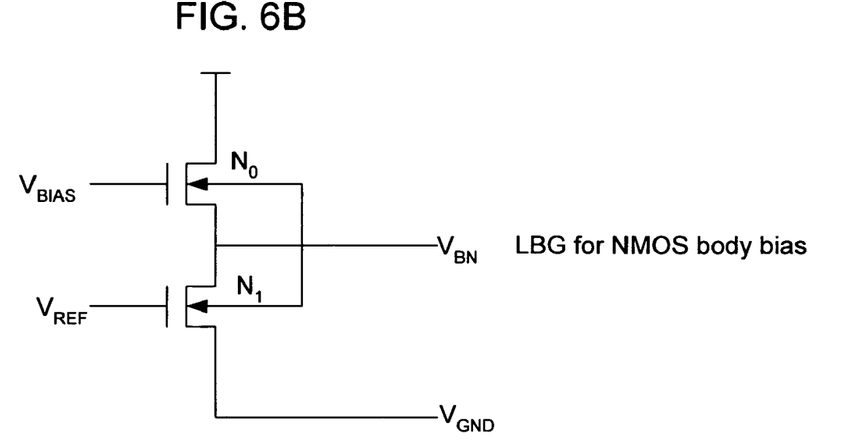
Figure 6C:
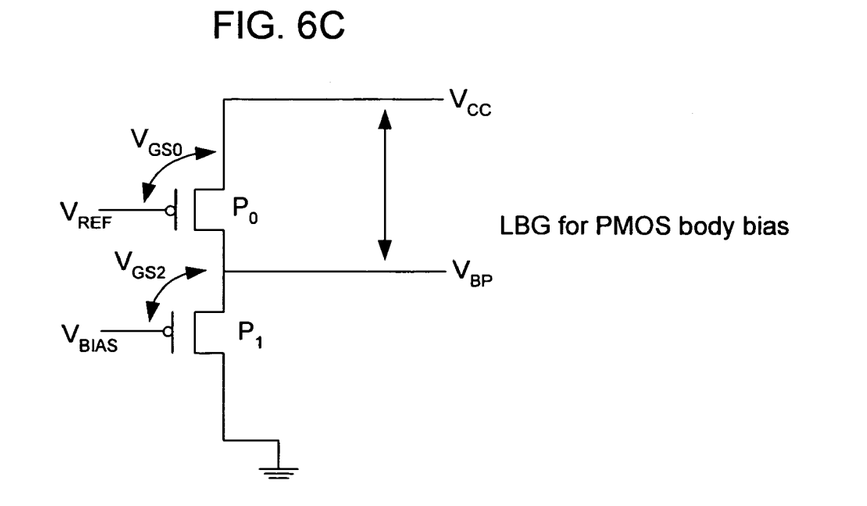

According to various embodiments, various types of CBGs and LBGs may be employed. For example, FIGS. 6A, 6B, and 6C depicts examples of a CBG, a NMOS LBG, and a PMOS LBG that may be employed in order to generate the forward body bias described above. In particular, FIG. 6A depicts an exemplary CBG while FIGS. 6B and 6C depict an LBG for NMOS body bias and an LBG for PMOS body bias, respectively. Note that other CBG and LBG circuitry types may also be employed and the examples depicted in FIGS. 6A, 6B, and 6C are for illustrative purposes only.

Figure 7:
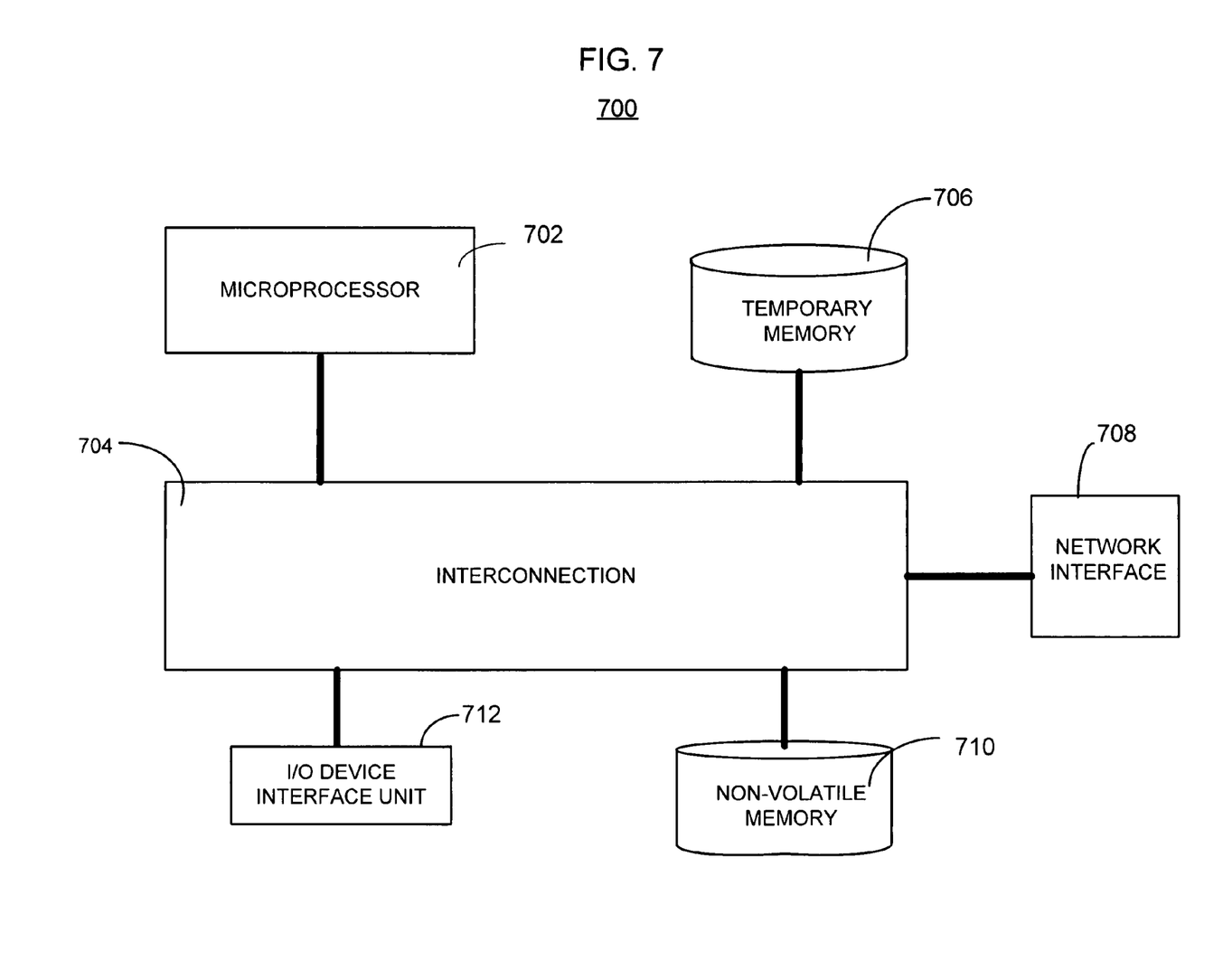
FIG. 7 is a block diagram of an example system, according to some embodiments of the invention.

Referring now to FIG. 7, where a system 700 in accordance with some embodiments is shown. The system 700 includes a microprocessor 702 that may be coupled to an interconnection 704, which may include one or more chips. The system 700 may further include temporary memory 706, a network interface 708, an optional nonvolatile memory 710 (such as a mass storage device) and an input/output (I/O) device interface unit 712. In some embodiments, the input/output device interface unit 712 may be adapted to interface a keyboard, a cursor control device, and/or other devices. One or more of the above-enumerated elements, such as microprocessor 702, may include the body bias circuitry described above.

Depending on the applications, the system 700 may include other components, including but not limited to chipsets, RF transceivers, mass storage (such as hard disk, compact disk (CD)), digital versatile disk (DVD), graphical or mathematic co-processors, and so forth.

One or more of the system components may be located on a single chip such as a system on chip (SOC). In various embodiments, the system 700 may be a personal digital assistant (PDA), a wireless mobile phone, a tablet computing device, a laptop computing device, a desktop computing device, a set-top box, an entertainment control unit, a digital camera, a digital video recorder, a media recorder, a media player, a CD player, a DVD player, a network server, or device of the like.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the embodiments of the present invention. Therefore, it is manifestly intended that this invention be limited only by the claims.

What is claimed is:

1. A processor device, comprising:
   a processor core having a plurality of transistors; and
   a body bias circuitry coupled to the processor core, the body bias circuitry adapted to generate at least a first forward bias voltage for a first of the transistors, in response to a first control signal that is provided based at least in part on a first thermal condition of the processor core, the first thermal condition is as a result of a first temperature increase, the first forward bias voltage to decrease threshold voltage of the first of the transistors to a first lower threshold voltage.

2. The processor device of claim 1, wherein the body bias circuitry is further adapted to generate a second forward bias voltage for the first transistor, in response to a second control signal that is provided based at least in part on a second thermal condition of the processor core, the second thermal condition as a result of a second temperature increase, the second forward bias voltage to further decrease the threshold voltage of the first of the transistors to a second lower threshold voltage, the second lower threshold voltage being lower than the first lower threshold voltage.

3. The processor device of claim 1, wherein the body bias circuitry comprises a central bias generator adapted to generate an initial forward bias voltage in response to the first control signal, and a local bias generator coupled to the central bias generator to generate the first forward bias voltage based at least in part on the initial forward bias voltage.

4. The processor device of claim 3, wherein the processor device further comprises
   at least one thermal sensor disposed with the processor core to provide at least one thermal signal reflective of the first thermal condition of the processor core; and
   a control unit coupled to the at least one thermal sensor and the central bias generator to generate the first control signal based at least in part on the at least one thermal signal.

5. The processor device of claim 1, wherein the body bias circuitry is further adapted to generate a second forward bias voltage for a second of the transistors, in response to the first control signal.

6. The processor device of claim 5, wherein the body bias circuitry comprises a central bias generator adapted to generate an initial forward bias voltage in response to the first control signal, and a first and a second local bias generator coupled to the central bias generator to respectively generate the first and second forward bias voltages based at least in part on the initial forward bias voltage.

7. The processor device of claim 6, wherein the processor device further comprises
   at least one thermal sensor disposed with the processor core to provide at least one thermal signal reflective of the first thermal condition of the processor core; and
   a control unit coupled to the at least one thermal sensor and the central bias generator to generate the first control signal based at least in part on the at least one thermal signal.

8. The processor device of claim 2, wherein the processor device further comprises
   at least one thermal sensor disposed with the processor core to provide at least one thermal signal reflective of the first thermal condition of the processor core; and
   a control unit coupled to the at least one thermal sensor and the body bias circuitry to generate the first and second control signals based at least in part on the at least one thermal signal.

9. The processor device of claim 1, wherein the processor device further comprises
   at least one thermal sensor disposed with the processor core to provide at least one thermal signal reflective of the first thermal condition of the processor core; and
   a control unit coupled to the at least one thermal sensor and the body bias circuitry to generate the first control signal based at least in part on the at least one thermal signal.

10. The processor device of claim 1, wherein the absolute value of the first forward body bias voltage is greater than 0 volts.

11. The processor device of claim 1, where the transistors forms a plurality of functional blocks, and the functional blocks include blocks selected from the group consisting of execution units, register files, cache memory, and clock generation circuits.

12. In a processor device, a method, comprising:
    providing a first control signal based at least in part on a first thermal condition of a processor core in the processor device, the first thermal condition as a result of a first temperature increase; and
    in response to the first control signal supplying a first forward bias voltage to a first of transistors in the processor core to decrease the threshold voltage of the first of transistors to a first lower threshold voltage.

13. The method of claim 12, wherein said supplying comprises generating an initial forward bias voltage in response to the first control signal and translating the initial forward bias voltage to the first forward bias voltage.

14. The method of claim 12 further comprises supplying a second forward bias voltage to a second of the transistors in response to the first control signal.

15. The method of claim 14, wherein said supplying comprises generating an initial forward bias voltage in response to the first control signal and supplying the first and second forward bias voltages based at least in part on the initial forward bias voltage.

16. The method of claim 12, wherein said providing comprises generating a thermal signal based at least in part on the first thermal condition and providing the first control signal in response to the thermal signal.

17. The method of claim 12, further comprises generating a second forward bias voltage to the first transistor in response to a second control signal that is provided based at least in part on a second thermal condition of the processor core, the second thermal condition as a result of a second temperature increase, the second forward voltage to decrease the threshold voltage of the first of transistors to a second lower threshold voltage, the second lower threshold voltage lower than the first lower threshold voltage.

18. The method of claim 12 further comprises ceasing the supplying of the first forward bias voltage when a second control signal is provided based at least in part on a second thermal condition of the processor core, the second thermal condition corresponding to a higher processor core temperature than a processor core temperature corresponding to the first thermal condition.

19. A system, comprising:
a processor device, including:
a processor core having a plurality of transistors; and
a body bias circuitry coupled to the processor core, the body bias circuitry adapted to generate at least a first forward bias voltage for a first of the transistors, in response to a first control signal that is provided based at least in part on a first thermal condition of the processor core, the first thermal condition is as a result of a first temperature increase, the first forward bias voltage to decrease threshold voltage of the first of the transistors to a first lower threshold voltage;
an interconnection coupled to the processor device; and
a mass storage coupled to the interconnection.

20. The system of claim 19, wherein the body bias circuitry is further adapted to generate a second forward bias voltage for the first transistor, in response to a second control signal that is provided based at least in part on a second thermal condition of the processor core, the second thermal condition as a result of a second temperature increase, the second forward bias voltage to further decrease the threshold voltage of the first of the transistors to a second lower threshold voltage, the second lower threshold voltage being lower than the first lower threshold voltage.

21. The system of claim 19, wherein the body bias circuitry comprises a central bias generator adapted to generate an initial forward bias voltage in response to the first control signal, and a local bias generator coupled to the central bias generator to generate the first forward bias voltage based at least in part on the initial forward bias voltage.

22. The system of claim 21, wherein the processor device further comprises
at least one thermal sensor disposed with the processor core to provide at least one thermal signal reflective of the first thermal condition of the processor core; and
a control unit coupled to the at least one thermal sensor and the central bias generator to generate the first control signal based at least in part on the at least one thermal signal.

23. The system of claim 19, wherein the body bias circuitry is further adapted to generate a second forward bias voltage for a second of the transistors, in response to the first control signal.

24. The system claim 23, wherein the body bias circuitry comprises a central bias generator adapted to generate an initial forward bias voltage in response to the first control signal, and a first and a second local bias generator coupled to the central bias generator to respectively generate the first and second forward bias voltages based at least in part on the initial forward bias voltage.

25. The system of claim 24, wherein the processor device further comprises
at least one thermal sensor disposed with the processor core to provide at least one thermal signal reflective of the first thermal condition of the processor core; and
a control unit coupled to the at least one thermal sensor and the central bias generator to generate the first control signal based at least in part on the at least one thermal signal.

26. The system of claim 20, wherein the processor device further comprises
at least one thermal sensor disposed with the processor core to provide at least one thermal signal reflective of the first thermal condition of the processor core; and
a control unit coupled to the at least one thermal sensor and the body bias circuitry to generate the first and second control signals based at least in part on the at least one thermal signal.

27. The system of claim 19, wherein the processor device further comprises
at least one thermal sensor disposed with the processor core to provide at least one thermal signal reflective of the first thermal condition of the processor core; and
a control unit coupled to the at least one thermal sensor and the body bias circuitry to generate the first control signal based at least in part on the at least one thermal signal.

28. The system of claim 19, wherein the system further comprises an input/output device interface unit adapted to interface at least a selected one of a keyboard and a cursor control device.

29. The system of claim 19, wherein the system is a selected one of a set-top box, a digital camera, a CD player, a DVD player, a wireless mobile phone, a tablet computing device, or a laptop computing device.

* * * * *

UNITED STATES PATENT AND TRADEMARK OFFICE
CERTIFICATE OF CORRECTION

| | |
|---|---|
| PATENT NO. | : 7,106,128 B2 |
| APPLICATION NO. | : 10/982266 |
| DATED | : September 12, 2006 |
| INVENTOR(S) | : James W. Tschanz et al. |

Page 1 of 1

It is certified that error appears in the above-identified patent and that said Letters Patent is hereby corrected as shown below:

Column 6

Line 54, "...b-ias generator..." should read --...bias generator...--.

Column 7

Line 9, "...,CBS 508..." should read --...,CBG 508...--.

Line 22, "...device 500,..." should read --...device 500.--.

Signed and Sealed this

Twenty-ninth Day of September, 2009

David J. Kappos
*Director of the United States Patent and Trademark Office*